Nov. 21, 1950     F. L. McGUFFIN     2,530,396
APPARATUS FOR PHOTOGRAPHIC REPRODUCTION
BY MEANS OF AN ELECTRONIC FLASH BULB
Filed Jan. 23, 1948     2 Sheets-Sheet 1

Inventor.
FRANK L. McGUFFIN,
by Ray C. Bachelor
Attorney

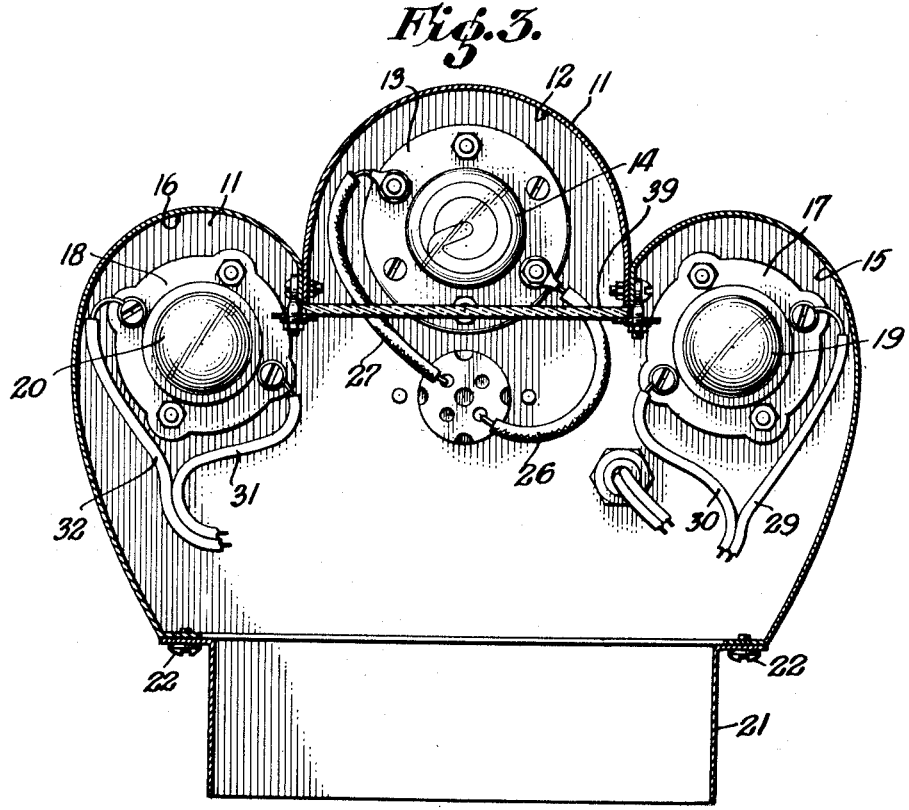
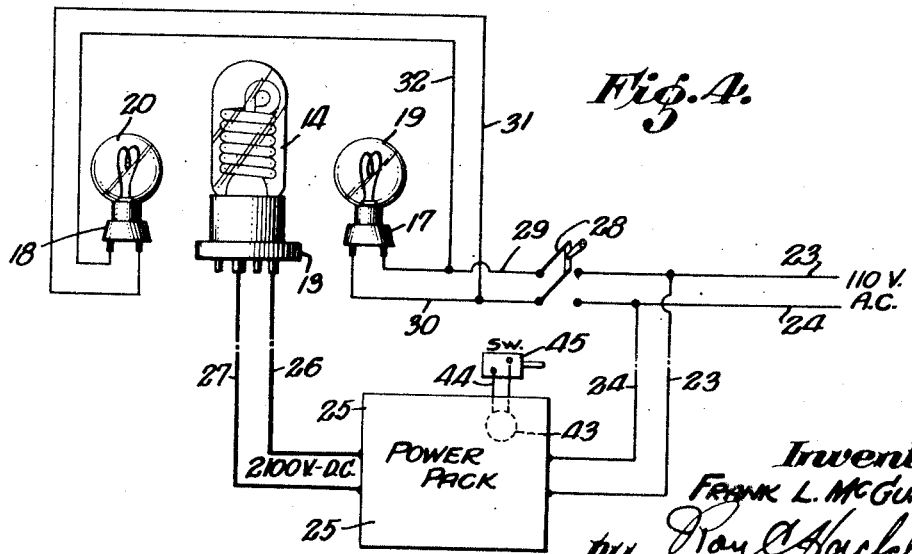

Patented Nov. 21, 1950

2,530,396

UNITED STATES PATENT OFFICE 2,530,396

APPARATUS FOR PHOTOGRAPHIC REPRODUCTION BY MEANS OF AN ELECTRONIC FLASH BULB

Frank L. McGuffin, Inglewood, Calif.

Application January 23, 1948, Serial No. 4,053

1 Claim. (Cl. 88—24)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

My invention relates to an apparatus for photographic reproduction by means of a gaseous electronic flash tube.

During the use of a normal tungsten filament bulb an excessive amount of heat is generated and exposure to such excessive heat may damage a negative or transparency which is being printed, which permanent damage may result from the buckling, melting or scorching of the negative.

In color printing it is necessary also to maintain a constant color temperature.

My invention overcomes these serious hazards by the use of a gaseous electronic flash tube by means of which intensely bright light is momentarily flashed through the negative upon a sensitized material without the accompaniment of intense heat as is usual with the tungsten type of bulb. The number of flashes is controlled by an operator and varies with the distance between the negative and the sensitized material and the density of the negative.

In the accompanying drawings:

Figure 3 is a section on the line 3—3 of Figure 2.

Figure 4 is a wiring diagram of my device, including a power pack coupled thereto, the relative position of said power pack being indicated by a rectangle.

In these drawings:

Figure 1:
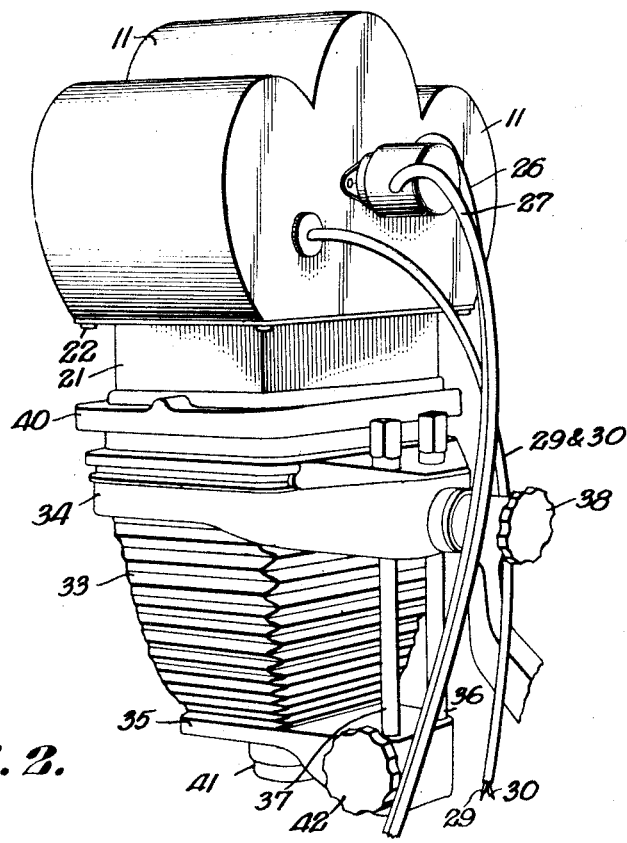
Figure 1 is a perspective view of my device and an attached adapter collar mounted upon an enlarging camera.
Figure 2:
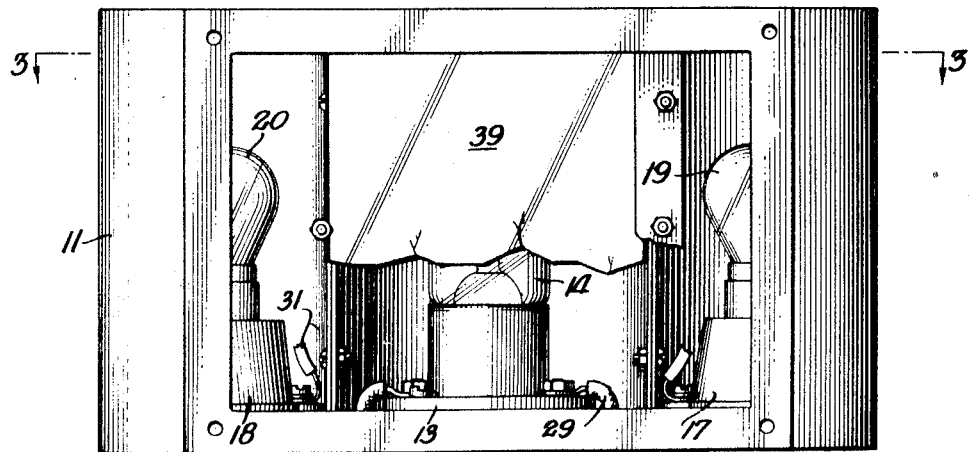
Figure 2 is an elevation of my device with parts broken away to disclose a gaseous electronic flash tube mounted in a suitable socket.

An enlarger head shell 11 is provided with a central curved reflector 12 having a rigidly mounted socket 13 for a gaseous electronic flash tube 14. The shell also includes two auxiliary curved reflectors 15; 16 arranged to reflect light in directions intersecting the axial line of light reflected by said first curved mirror 12. Axially centered within these mirrors 15; 16 are lamp sockets 17; 18 respectively, for incandescent lamps 19; 20 used solely for focusing the projected image of the negative upon the projection easel in the focal plane.

A tubular adapter collar 21 is rigidly connected by a plurality of holding screws 22 to my enlarger head 11.

In Figure 4 a wiring diagram indicates the electrical circuits. Power is supplied at approximately 110 volts A. C. through feed wires 23; 24 to a conventional "power pack" 25 which steps up the voltage to approximately 2100 volts D. C. to supply the gaseous electronic flash tube 14 through transmission wires 26; 27. Current is also drawn at will from the feed wires 23; 24 through a suitable manually operated switch 28 to the focusing bulbs 19; 20 through the wires 29; 30 and 31; 32, respectively.

My adapter 21 is modified to fit within a selected enlarging camera 33 supported by brackets 34; 35 on parallel supporting rods 36; 37 at a selected height with the aid of a suitable clamping screw 38. The camera is provided with an opal glass diffuser 39, a suitable plate holder 40, a lens mounted in a lens holder 41 and a suitable manually operated focusing thumb screw 42.

The power pack 25 is provided with a means for indicating the relative pressure of static electric force such as an illuminated lens 43 and an extension cord 44 provided with a suitable trigger button switch 45.

My enlarger head may be used with the same "powerpack" used in taking photographs, and is very economical of current. For example, a 200 watt second power pack will consume less than a 100 watt light bulb.

Contact prints may be made with my enlarger head used as an overhead printer. My device operates under a substantially constant color temperature, regardless of the input voltage variations. The maintenance of constant color temperatures is highly important for color reproduction. My device produces a diffused light which has been found very good for exposing tri-color emulsion paper from transparencies, and the same applies to printing color paper from complementary colored negatives.

The operation of my method and apparatus is as follows:

An adapter collar 21 is selected which will fit an enlarging camera 33 and is used to mount my enlarger head 11 upon the camera 33, which in turn is mounted on suitable supporting rods 36; 37. A negative is placed in the holder 40 and the switch 28 closed, thereby lighting the focusing lamps 19; 20. By means of the clamping screw 38 and the focusing thumb screw 42, the image of the negative is focused upon a projection easel (not shown) and the switch 28 is opened. The power pack 25 with the aid of a transformer and a condenser (neither of which is now novel and therefore not illustrated) converts a 110 volt A. C. current into very high voltage direct static current. When the static pressure has increased the intensity of illumination of the lens 43 to a brightness which the operator considers sufficient, he presses the trigger button switch 45 and immediately releases it. This produces a lightning-like flash of constant color temperature and of relatively low ultra-violet component for each flash upon sensitized material. These lightning-like flashes are herein referred to as "electronic flashes" which like lightning last only for an instant so that there is an interval after each flash during which the current supplied to the transformer and condenser again builds up the static pressure required for producing electronic flashes. By developing the exposed material in the usual way, it will be determined whether or not a single flash was a sufficient exposure. If insufficient, other exposures are made with a succession of flashes until the proper exposure is found. Once the proper exposure has been found, as many prints as desired may be made by exposing each sensitive sheet to the number of flashes found to give the best results.

To summarize the operation:

Plug in the high voltage cable 26; 27 to connect the power pack 25 with the gaseous electronic flash tube 14 then close the switch 28 to supply current to the focusing bulbs 19; 20. After focusing, open the switch 28 and connect the 110 volt A. C. current source with the input of the power pack 25, place material to be exposed on the easel and press the flash trigger button 45. The number of flashes varies with the number and size of the lens openings and this gives an operator a choice of a number of exposure combinations.

While I have shown and described a preferred embodiment of my invention, changes may be made in the construction and arrangement without departing from the spirit and scope of the invention as disclosed herein.

What I claim is:

An electronic flash enlarger head comprising a plurality of curved reflectors, a socket for a focusing electric light substantially at the optical center of each of two reflectors and a socket for a gaseous electronic flash tube having an axis centrally located with respect to the optical axis of said head, and substantially at the optical center of a central curved reflector, means for supplying high voltage static surges to said flash tube socket, and means for at will closing the circuit to said flash tube socket.

FRANK L. McGUFFIN.

REFERENCES CITED

The following references are of record in the file of this patent:

UNITED STATES PATENTS

| Number | Name | Date |
| --- | --- | --- |
| 1,313,815 | Hansen | Aug. 19, 1919 |
| 1,635,014 | Smith | July 5, 1927 |
| 1,781,044 | Arana | Nov. 11, 1930 |
| 1,949,892 | Wright | Mar. 6, 1934 |
| 2,003,190 | Hineline | Mar. 28, 1935 |
| 2,085,580 | Gottlieb | June 29, 1937 |
| 2,194,808 | Pooley | Mar. 26, 1940 |
| 2,251,998 | Goodale | Aug. 12, 1941 |
| 2,353,512 | Simmon | July 11, 1944 |
| 2,388,394 | Drucker | Nov. 6, 1945 |
| 2,469,076 | Rabinowitz | May 3, 1949 |

FOREIGN PATENTS

| Number | Country | Date |
| --- | --- | --- |
| 105,956 | Switzerland | Sept. 25, 1923 |
| 568,840 | Great Britain | Apr. 23, 1945 |

OTHER REFERENCES

"Photography" by Mees, 1937, page 214, published by MacMillan & Co.